Figure 1:
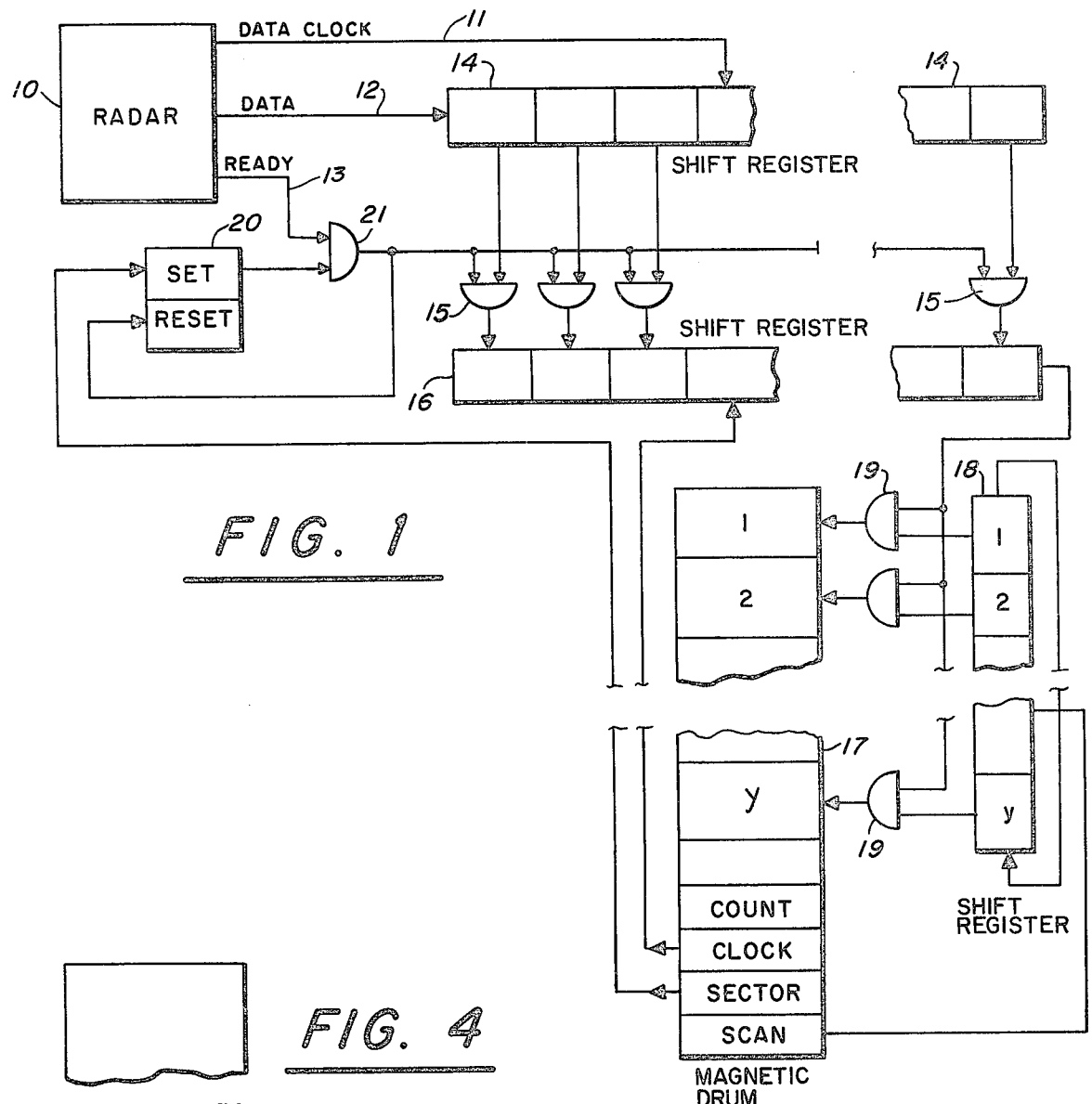

United States Patent [19]

Dillard

[11] 4,214,239
[45] Jul. 22, 1980

[54] MAGNETIC DRUM STORAGE FOR THE TRACK BEFORE DETECT SYSTEM

[75] Inventor: George M. Dillard, San Diego, Calif.

[73] Assignee: The United States of America as represented by the Secretary of the Navy, Washington, D.C.

[21] Appl. No.: 270,119

[22] Filed: Apr. 2, 1963

[51] Int. Cl.² .............................................. G01S 9/02
[52] U.S. Cl. ................................................ 343/5 VQ
[58] Field of Search ...................... 343/5, 7, 5 DP, 11, 343/5 VQ; 235/151 A, 151 J

[56] References Cited

U.S. PATENT DOCUMENTS

| 3,035,263 | 5/1962 | Lader et al. | 343/5 DP X |
| 3,075,189 | 1/1963 | Lisicky | 343/5 R X |
| 3,151,322 | 9/1964 | Hildebrandt | 343/5 DP |

*Primary Examiner*—Malcolm F. Hubler

EXEMPLARY CLAIM

1. A track detection system comprising;
   receiving means for receiving reflected radio frequency signals from an object in a given medium;
   said receiving means for receiving said signals at a predetermined scan rate;
   storage means operatively coupled to said receiving means for storing information corresponding to reflected radio frequency signals from an object in a given medium;
   referencing means included in said storage means for referencing received reflected radio frequency signals with respect to the azimuth from which the reflected information is received during a scan of said receiving means;
   said storage means being adapted for storing a multitude of scans;
   ordering means operatively coupled to said storage means for accepting information from said storage means and sorting said information according to range and sector where range is broken up into a discrete number of increments referred to as range bins and where range is the distance from the receiving means to an object in a medium and sector is the azimuth from which a signal is received at a given time;
   other storage means operatively connected to said ordering means for storing information corresponding to the number of hits per range bin where hits are defined as the times when an object is illuminated by radio frequency energy;
   said number of hits per range bin having been stored in said first mentioned storage means as range information; and
   track detector means operatively connected to said other storage means for making a decision as to the absence or presence of a track in the medium.

6 Claims, 4 Drawing Figures

MAGNETIC DRUM STORAGE FOR THE TRACK BEFORE DETECT SYSTEM

The invention described herein may be manufactured and used by or for the Government of the United States of America for governmental purposes without the payment of any royalties thereon or therefor.

The present invention relates to a radar tracking system and more particularly, to a track detection system which presents decisions relative to the existence of a target track rather than a sequence of decisions relative to target position and specifically, to a magnetic drum storage for a track detection system.

The present invention is intended for use with the Track-Before-Detect System of co-pending application Ser. No. 137,944, filed Sept. 8, 1961, now U.S. Pat. No. 3,731,304. In the system set forth in co-pending 137,944 the data processing calls for nzy detectors, where n is the number of test tracks, z the number of azimuth sectors, and y is the number of elements i.e. target positions in each track.

Suppose that the radar system has a 4° beam width and that the antenna rotates at the rate of 15 RPM, and that decisions are based on observations made for one minute. Then z has the value 90 and y is 15; hence for each track considered, 1550 detectors would be necessary to cover all 360°. In addition, an AND gate matrix would be necessary for each sector. If the number of range bins considered is 36, each matrix would necessarily be 15×36, i.e. 540 AND gates would be necessary for each matrix. Then to cover 90 sectors 48,600 AND gates would be necessary. For any reasonable number of test tracks, the amount of equipment becomes large and would not lend itself to expansion to cover 360° because of size, complexity, and cost of the equipment involved. This would limit the installation or use of the equipment built along such lines.

An object of the present invention is to provide an improved track detection system.

A further object of the present invention is to provide an improved track detection system which utilizes a minimum of elements.

An additional object of the present invention is to provide an improved track detection system at a reduced cost through the use of a minimum number of elements in the system.

Another object of the present invention is to provide an improved track detection system which is relatively trouble free and simple to maintain.

An additional object of the present invention is to provide a track detection system wherein data processed retains its identity as to range, azimuth and scan until cleared.

Various other objects and advantages will appear from the following description of one embodiment of the invention and the novel features will be particularly pointed out hereinafter in connection with the appended claims.

The present system and method utilizes a multichannel magnetic drum for the storage of information received. A number of channels equal to the number of antenna scans of which data is to be retained is used for data storage, and the remaining channels are used for synchronizing the information. Information is buffered from the radar into a buffer storage and read onto data channels according to range and for all azimuth sectors in the annular detection region. Information is read off the data channels into a shift register matrix composed of one shift register per data channel. The shift register matrix is connected to a detector set and information is accumulated in a detector from the shift register matrix. For each sequence considered, a decision i.e. target or no target is made for each azimuth sector.

Figure 4:
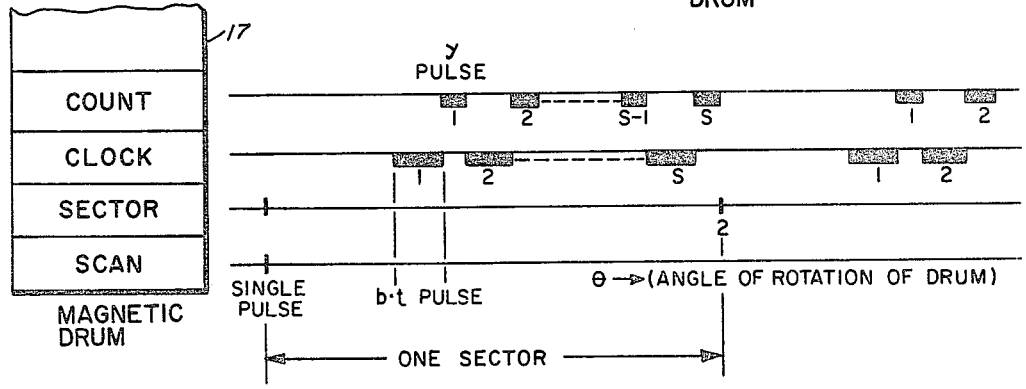
Figure 2:
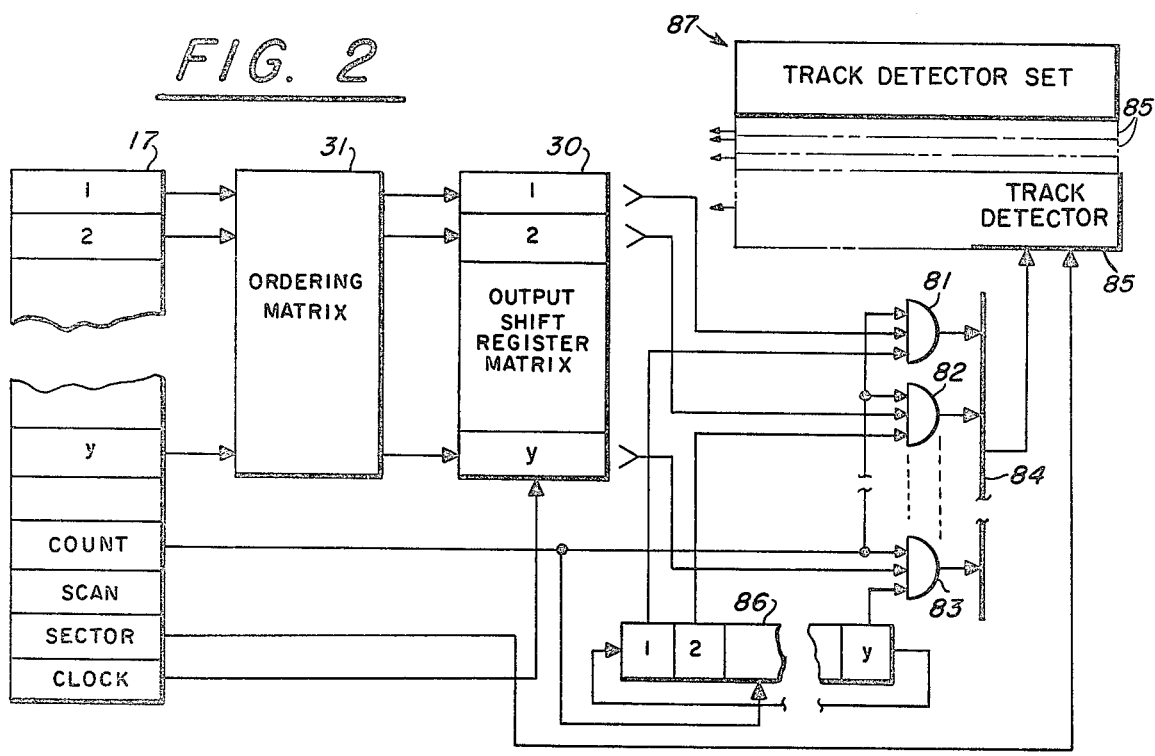
Figure 3:
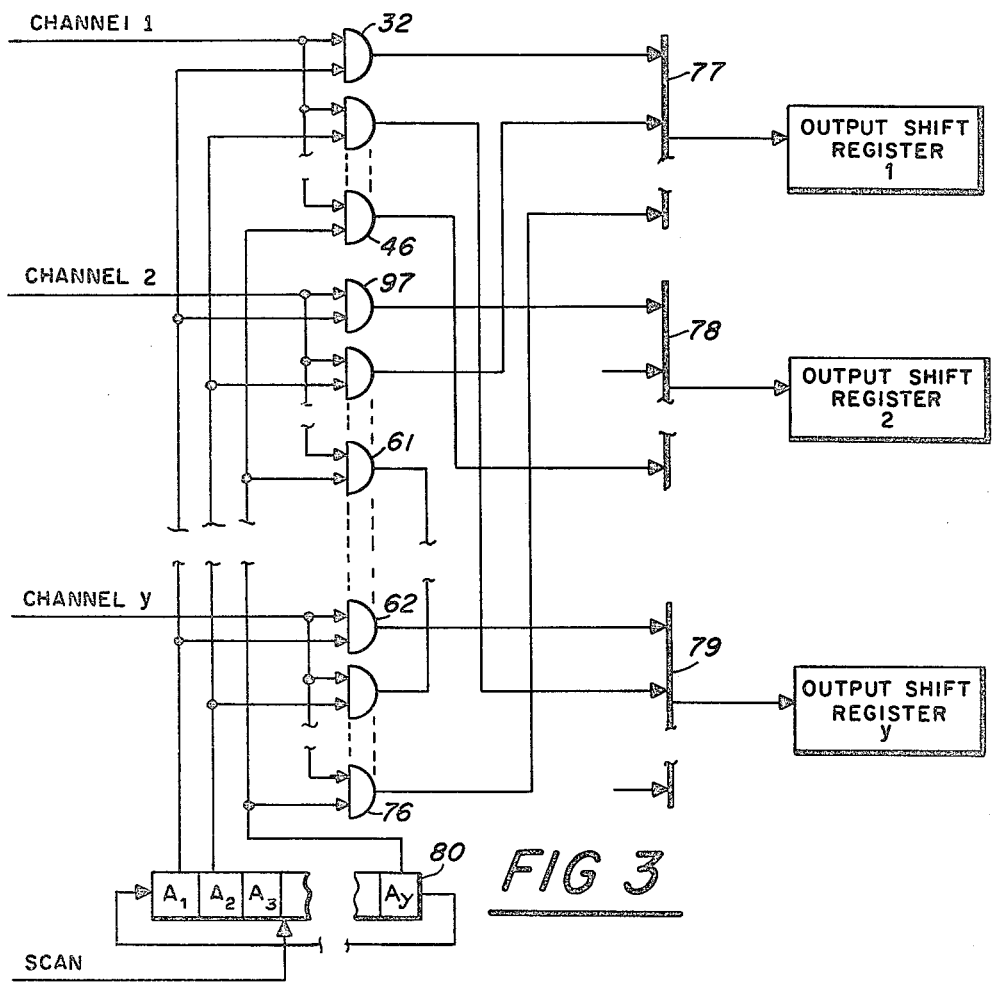

The invention is illustrated and described in conjunction with the accompanying drawings wherein:

FIG. 1 is a block diagram of a data storage system;
FIG. 2 is a block diagram of a data processing system;
FIG. 3 is a schematic diagram of the ordering matrix;
FIG. 4 is a line diagram of the details of the synchronizing information.

By way of background, it is noted that the detection problem to be considered is the detection of the passage of the target through an annular detection region. This annular region is divided into sectors depending on the radar beam width, and each sector is assumed to be divided into a number of discrete range bins.

In the track-before-detect system, targets are detected by integrating the radar data collected over a number of antenna scans rather than by performing a sequence of detection processes where each one depends only on data from a single antenna scan. Motion of targets is accounted for by selecting radar data from different range bins on successive antenna scans. Since actual target position sequences, or tracks, are not known before detection, processing must be performed for a large number of possible situations.

Co-pending application Ser. No. 137,944, now U.S. Pat. No. 3,731,304, Track-Before-Detect System discussed the theory as applied to a radar surveillance system. In the aforementioned system data are collected from b discrete range bins of each azimuth sector in the annular detection region and retained for a fixed number of scans, y. The number b depends on the radar range resolution and the depth of the detection region. The depth of the detection region, less than the maximum radar range, depends on the anticipated target velocity in the radar scan rate i.e. the depth of the annular zone is larger than the maximum distance any target of interest could travel in y scans.

To detect a radial target, in a particular azimuth sector, with a constant velocity of exactly one range bin per scan, data would be processed from range bin 1, scan i+1; from range bin 2, scan i+2; etc., and from range bin y scan i+y. The scans are numbered i+2, etc., since data processing must start after each scan to account for all possible target entry times. For detection of a radial target with a constant velocity of 2 range bins per scan, two possible situations exist; either the target is in the range bin 1 on the first scan, or the target is in range bin 2 on the first scan. Hence, data would be processed from range bin 1, 3, up to 2y−1, and data would be processed from range bin 2, 4, . . . 2y. Similar situations exist for target velocities of any integral multiple of one range bin per scan. If the target is not an integral multiple of one range bin per scan, many more situations exist depending on the target's velocity $v_t$, and the target's position p, in the annular zone when first scanned, hereinafter called ($v_t$, p).

In general for each scan ($v_t$, p), data are processed from range bin $a_i$, scan i+1; range bin $a_2$, scan i+2; etc., and from range bin $a_y$, scan i+y. The ordered set of numbers ($a_1, a_2, \ldots, a_y$) will be called a sequence. Note that for each pair ($v_t$, p), only one sequence results; but conversely, any given sequence can result from any pair ($v_t$, p) which lies in a region R contained in a rectangle defined by $v_l \leq v_t \leq v_u$, and $p_l \leq p \leq p_u$. Equations may be derived which will give the values $v_l$, $v_u$, $p_l$, and $p_u$ however, are not presented at this time. The same goes for equations defining the region R.

Previously the assumption has been made that only radial, or near radial targets need be considered for detection by TBD with the justification that non-radial targets would present cross-sections such that detection could easily be made by other methods. However, some tactical situations arise where the TBD system could be used to detect non-radial or, in some cases, tangential targets.

For non-radial constant velocity targets, the pair $(v_t, p)$ will be associated with the same sequence as in the case of radial targets. But here $v_t$ must be interpreted as the radial velocity of the target and the elements of the sequence must be further indexed as to azimuth sector; e.g. $(a_1, \theta_1, a_2, \theta_2, \ldots, a_y, \theta_y)$. From the above it is apparent that the extension to 3-D could be made and, though not excluded from consideration, is not discussed at this time.

Suppose the velocities of targets of interest are assumed to be in some interval between a lower velocity $v_L$ and an upper velocity $v_U$. Then only certain sequences result from target velocities in this range. However, if this range of possible target velocities is large, then the number of possible sequencies is also large, and processing data from all possible sequences could be difficult. Hence, some criteria could be established by which a "representative" set of sequences is selected, and data processed only for this representative set. This set of sequences will be called "test sequences". Another term for this might also be a covering sequence. A feasible though non-optimal way of selecting covering sequences is to first list all of the covered sequences and then arbitrarily select one as a covering sequence. Each of the other covered sequences is examined in turn, and, if it does not agree in at least c of its y elements with the corresponding elements of at least one of the sequences already selected as a covering sequence, the newly examined sequence is selected as a covering sequence itself.

The system described herein is an alternate method of data collection and data processing to accomplish the same task as the system described in co-pending 137,944 filed Sept. 8, 1961 entitled Track-Before-Detect System. The present system involves the use of a multi-channel, magnetic drum, disc or tape to store all of the data of interest from all the scans necessary in the decision making process. The drum is driven by a synchronous motor at the same rate as the antenna; hence, any azimuth information to be used in the data processing can be stored permanently on the drum. Data from each scan is stored on a separate channel on the drum until the desired number of scans have been observed, at which time the data from the first scan is replaced by data from the current one. The data, having been stored from the desired number of scans, is read off the drum and into a single matrix unit, one sector at a time. Processing of the data is done sector by sector and the same detectors used for one sector can be used for the next. Hence, nzy detectors and z AND gate matrices can be replaced by a magnetic drum and peripheral equipment, one matrix and n detectors. With the use of very high speed units and time sharing, it is possible that only one detector would be needed for all n tracks.

The system described here is essentially divided into two parts, data storage and data processing. The radar which collects the data is not considered to be part of the system. The inputs referred to could be from a general radar; however, the inputs would require possible modification to have the following form: See FIG. 1 for the terms which will be defined.

Data: Digital output from an analogue-to-digital converter which converts to digital form the video data from the b range bins of interest.

Data clock: A group of clock pulses which occur at the time of converting to digital form the video data from the discrete range bin of interest. Each group must contain the proper number of pulses to cause the digital data to be shifted into a storage shift register.

Ready: A pulse which occurs immediately after the digital data from the prearranged place of interest has been stored in the shift register; i.e. at the end of each group of data clock pulses.

In the system as set forth in FIG. 1, which represents the data storage portion, received radar radio frequency information is received on radar equipment 10. The data clock pulses appear on line 11 while the data from a digital to analogue converter, not shown, appears on line 12. The ready pulse from the radar appears on line 13.

A shift register 14 having bst stages, wherein b is the number of range bins of interest, s the average number of pulses transmitted by the radar in the azimuth sector, and t the number of bits necessary to represent the digital data from a single range bin is provided. The bst shift register 14 is used to store the digital data from the s previously transmitted pulses. It is to be understood that the data on line 12, instead of being in the form of ones and zeros, might also be quantized in a multi-level form. In such a case the register 14 would be altered to accomplish the storage of information where the information is quantized in other than ones and zeros. The output of the individual stages of the shift register 14 are coupled to AND gates 15 and then to the inputs of the individual stages of a shift register 16. Shift register 16 is also a bst stage shift register. This shift register is connected to shift register 14 in parallel by way of the bst AND gates 15. Between groups of data clock pulses all of the information in shift register 14 can be "written" into shift register 16 by applying an enabling pulse to the AND gates 15. This register is used as a buffer between shift register 14 and the write heads, not shown, of the magnetic drum.

A magnetic drum 17 is provided which is a multi-channel drum with a read head and write head for each channel. The read head and write heads are not shown in that the same are conventional, as is the magnetic drum.

The first y channels are reserved for data storage and the remaining channels are used for synchronizing information and counting information. The drum is driven by a synchronous motor, not shown, at the same rate, and possibly from the same source, as the antenna.

Another shift register 18 having y stages is provided for controlling the drum channel on which data is recorded. Again y is the number of scans from which data is received and stored. Shift register 18 contains $y-1$ "zeros" and a single "one". The "one" is shifted serially around i.e. the first stage of of the register 18 is connected to the first channel as shown and the position of the "one" is used to select the drum channel on which data is recorded. The output of the individual registers of the shift register 18 are coupled to AND gates 19 of which there would be y. The output of the AND gates 19 are then connected to their respective individual write heads, not shown, which would in turn be associated with individual channels which are numbered 1 through y on the magnetic drum respectively.

The channel labeled "scan" of FIG. 1 contains a permanently recorded pulse which is read out each time the antenna makes a complete revolution. The sector channel has pulses permanently recorded at regular intervals as shown in FIG. 4 and is used to indicate the azimuth sector in which the antenna is pointed. The channel labeled "clock" contains sets of s groups of pulses, each group containing bt pulses. This information is permanently recorded on the drum so that each set of clock pulses is read out between sector pulses. Again, this is shown in FIG. 4. The output of this channel is used as synchronizing information in writing data on and reading off the drum. The channel labeled "count" will be described in a discussion on data processing.

The clock output from the magnetic drum is connected to an input on the shift register 16 for shifting the contents of the register. One output from the scan channel read head is coupled back into the shift register 18, as shown, for shifting the one through the register. An output from the sector read head is coupled to the set input of an RS flip-flop 20 and the one output from the RS flip-flop 20 is connected as one input to an AND gate 21. The output of AND gate 21 is coupled back to the reset input of flip-flop 20 as a reset pulse. The same output is also coupled as an enabling gate for AND gates 15. The enabling pulse for AND gate 21 comprises the ready pulse coupled in on line 13 from radar unit 10.

Each time the radar receives the return from a transmitted pulse, the digital data, in this case from an analogue-to-digital converter, is shifted into shift register 14. Since the capacity of register 14 is bst bits, only information from the s previously transmitted pulses is retained. Hence, after the return from each pulse is received, bt bits of data are shifted out of register 14 and bt bits of data are shifted in.

The magnetic drum rotates synchronously with the antenna and a sector pulse is read off the drum each time the antenna passes to a new sector. This sequence is shown in FIG. 4. This pulse sets flip-flop 20 which in turn enables AND gate 21. The next ready pulse is then passed by AND gate 21. The output of the AND gate 21 resets flip-flop 20 and causes the contents of shift register 14 to be shifted into shift register 16. As a result of these operations, at the time a sector pulse is read out, the data from the previous sector is written into shift register 16. This data is the digital video data from the last s pulses transmitted in the previous sector.

Shift register 16 is now loaded with information to be stored for the previous sector. As the drum continues to rotate, clock pulses are read off the drum and cause the contents of shift register 16 to be shifted through a write head depending on the position of the "one" in shift register 18. The data is thus written on the drum on one of the y channels.

The drum continues to rotate in synchronism with the antenna and the data is recorded on the same channel, sector by sector, until a complete revolution of the antenna and the drum is made. When this occurs, a scan pulse is read out and coupled to the shift register 18 causing the "one" in shift register 18 to be shifted by one position so that the data is now recorded on the next data channel.

FIG. 2 is a block diagram of the data processing system. The data processing system consists of three parts, not including the magnetic drum: An output shift register matrix 30 labeled OSR matrix, an ordering matrix 31, and a track detector set 32.

The OSR matrix 30 is composed of y shift registers, each shift register having tb stages. In the case of the present situation when t corresponds to a one or a zero and b corresponds to range bins and typically might be 36 there would be 36 stages in each of the OSR's. This matrix acts as a buffer between the magnetic drum and the track detectors. The output of the clock channel is used in shifting data into the OSR matrix to retain synchronism of the information.

The ordering matrix is shown in detail in FIG. 3 and consists of y sets of y AND gates and y y-input OR gates arranged as shown. This would consist of AND gates for channel 1 corresponding to AND gates 32 through 46; for channel 2, 47 through 61 and for channel y, 62 through 76. The OR gates for the respective channels would correspond to OR gate 77, 78, and 79. It is to be understood that there are only three channels shown and that actually there are y channels and in the instant case y is taken to be 15. There would also be 15 OSR's.

A y stage shift register 80 identical to shift register 18 is used to enable only one AND gate of each set of the y AND gates. Shift register 80 is also shifted by the scan pulse which is read off the magnetic drum 17.

The purpose of the ordering matrix is to cause data from the drum to be read into the OSR matrix 30 in the order in which it was recorded; i.e. the oldest recorded channel or scan is read into OSR #1, the most recently recorded channel or scan, is read into OSR #y.

The track detector set 32 consists of an arbitrary number of track detectors, one for each track of interest. In the present instant only one track detector and associated circuits are shown for the purposes of simplicity. If the digital data is represented by more than one bit per range gate, i.e. in multi-level data representation, a detector would take the form of an accumulator, otherwise a binary adder will suffice. In the present instance, in that the quantizing value consists of ones and zeros a binary counter is taken as representative. An equal-to-or-greater-than comparator, not shown, would also be necessary in the decision making process. A track connection is made to t stages of the y OSR's of the OSR matrix 30. These t stages are the shift register stages containing the data for a particular range and scan. Thus, a connection made from one stage of OSR #1 to AND gate 81; another connection is made from one stage of OSR #2 to AND gate 82 and $y^{th}$ connection from one stage of OSR #y to AND gate 83. The outputs of the AND gates are coupled through an OR gae 84 to a track detector 85 where the decision making process is accomplished. The track detector output then goes to an equipment where the decision is utilized.

In that a simple counter is used as a track detector some means must be had for making an individual count and connecting the contents of the individual shift register to the proper AND gate so the count may be accomplished at the proper time. This is obtained through the use of a y stage shift register 86 which has a 1 in one of the stages and y − 1 zeros. This is a recirculating register and the output from the $y^{th}$ stage is connected back to the first stage of the register. The shift pulse is taken from the count channel on the magnetic drum 17. The same count output is also coupled as one pulse to the AND gates 81, 82, 83.

In FIG. 3, suppose that initially stage $A_1$ of shift register 80 is "one", and y−1 stages at zero. After y scans $A_1$ would again be at "one" and the data from y scans would have been recorded on the drum 17 with the oldest data recorded on channel 1. Since $A_1$ is at "one", the output of channel 1 goes, via the y-input OR gate 77, to OSR #1. Channel 2 goes to OSR #2 OR gate 78 etc. One scan later channel 1 contains the latest data and channel 2 contains the oldest. However, stage 2 of shift register 80 is now at "one," causing the output of channel 2 to go to OSR #1, channel 3 to go to OSR #2, etc. and channel 1 to go to OSR #y. This is done in that the data for 15 scans is processed simultaneously and it is desired that the oldest data always appear in OSR #1 and the latest in OSR #y. After the next scan the output of channel 3 is gated to OSR #1 etc. and after y scan $A_1$ is again at "one" and the cycle is repeated.

The ordering matrix 31 directs the data being read off the drum to the proper OSR. As the drum rotates, clock pulses are read off the drum causing the data to be stored temporarily in OSR matrix 30 consisting of the y shift registers having bt stages. Between groups of clock pulses and stored permanently on the drum are groups of count pulses as shown in FIG. 4. Each group of count pulses contain y pulses thus, in the time sequence a set of pulses, bt pulses, as controlled by the clock channel are read into the OSR matrix 30. Between the 1 and 2 group of pulses from the clock channel the count channel couples y pulses to the serial shift register 86. In that a "one" appears only in one of the y stages of register 86 the AND gates 81–83 in the example are enabled sequentially and the output of OSR #1 is gated first to AND gate 81 then the output of OSR #2 to AND gate 82 and then the output of the stage of OSR #y to AND gate 83 and the count made. It is to be understood again that there are fifteen AND gates and fifteen OSR's in the present example. It is also to be understood that only one stage of each of the OSR's is coupled to a corresponding AND gate and for another test track there will be another AND gate, another shift register, and another track detector unless time sharing and high speed units are used.

Each count pulse causes the digital data from a particular range stored in a particular OSR to be added i.e. accumulated in a track detector such as track detector 85. The first group of count pulses sequentially adds i.e. accumulates the data from a particular range in OSR #1; another range in OSR #2 and the final range in OSR #y. This corresponds to the accumulation of data from the first pulse transmitted in a given sector for 15 scans. The next group of count pulses accumulates, together with the accumulation from the first group data from the second pulse transmitted in the same given sector. This is continued for y groups of count pulses; accumulating all the data of interest for the particular track under consideration. When all of the data is accumulated, a decision is made, the detector 85 is cleared, and as the drum rotates, the next sector is considered in exactly the same manner. The reset for the track detector is accomplished by reading off the sector pulse from the magnetic drum 17. As shown in FIG. 4 this will occur after the $s^{th}$ group of y pulses. Therefore, it is seen that each of the individual sets of the pulses transmitted by the radar system causes the output of the OSR matrix 30 to be read into the track detector and counted.

The embodiment of the invention has set forth that the magnetic drum rotates at the same rate as the antenna and that all of the data from one scan is stored on a single channel of the drum. It is to be understood that in some cases it might be impractical to store all of the data from one scan on a single channel due to the amount of data. This would be the case if the storing of the total amount of data for a single scan led to an excessively large diameter drum. In such a case the drum could be rotated synchronously at some multiple, K, of the antenna scan rate of the data from a single scan be stored on K channels.

The circuitry associated with the magnetic drum would be altered accordingly, for example, shift register 18 would have 1CY stages and would be shifted on each rotation of the drum. Other circuits are not referred to in that the changes are a matter of engineering skill and do not affect the basic concept involved.

For the purpose of setting forth the advantages for the present system over that set forth in co-pending application Ser. No. 137,944 Track-Before-Detect System, the following parameters will be assumed: Number of azimuth sectors 90; number of target positions per track 15; number of interest 36. This corresponds to b=36 y=15, and z=90.

The first advantage is the saving in equipment required. In the system of co-pending application Ser. No. 137.944 using the above parameters, 1350 detectors are required per track. There are 15 connections per track and the number of electrical connections involved is likely to cause errors. Trouble shooting in case of detector failure also presents a problem. The present system would require only one detector per track, hence only a few electrical connections and essentially no troubleshooting problems.

Also mentioned previously is the fact that an AND gate matrix consisting of 540 AND gates is necessary for each azimuth sector. Then, to cover 90 sectors, 48,600 AND gates would be necessary. Again, the number of electrical connections necessary on each matrix is of a very high order. The present system would require only one matrix for all 90 azimuth sectors. Since one detector in the new system will do the work of 1350 in the system of the copending application Ser. No. 137,944, now the U.S. Pat. No. 3,731,304, the number of tracks to be considered could be increased without an astronomical increase in the number of detectors required. Next, since the data is stored for a number of scans, video data retains its identity as to range, azimuth, and scan until the data from the desired number of scans has been stored. In the system of the co-pending application, once the data has been applied to the detectors its identity is lost except as to azimuth. Any further need for the data can not be filled.

Except for the magnetic drum, the equipment for the entire proposed system, covering all sectors, could be made smaller in physical size then could the equipment previously necessary for only one azimuth sector. Hence, in actual implementation of the system miniaturization is not a problem.

It is to be understood that the term magnetic drum as used throughout this disclosure may relate to either a drum, a magnetic tape in the form of a continuous loop or a magnetic disc and each would serve the same purpose.

Obviously many modifications and variations of the present invention are possible in the light of the above teachings. It is, therefore, to be understood that within the scope of the appended claims the invention may be practiced otherwise than as specifically described.

I claim:

1. A track detection system comprising;
   receiving means for receiving reflected radio frequency signals from an object in a given medium;
   said receiving means for receiving said signals at a predetermined scan rate;
   storage means operatively coupled to said receiving means for storing information corresponding to reflected radio frequency signals from an object in a given medium;
   referencing means included in said storage means for referencing received reflected radio frequency signals with respect to the azimuth from which the reflected information is received during a scan of said receiving means;
   said storage means being adapted for storing a multitude of scans;
   ordering means operatively coupled to said storage means for accepting information from said storage means and sorting said information according to range and sector where range is broken up into a discrete number of increments referred to as range bins and where range is the distance from the receiving means to an object in a medium and sector is the azimuth from which a signal is received at a given time;
   other storage means operatively connected to said ordering means for storing information corresponding to the number of hits per range bin where hits are defined as the times when an object is illuminated by radio frequency energy;
   said number of hits per range bin having been stored in said first mentioned storage means as range information; and
   track detector means operatively connected to said other storage means for making a decision as to the absence or presence of a track in the medium.

2. A track detection system comprising;
   means for receiving radio frequency information from objects in a medium;
   buffer means operatively connected to said receiving means for serially storing received radio information corresponding to increments of range for a given azimuthal sector;
   storage means operatively coupled to said buffer means for storing information therein corresponding to radio information received with respect to range information and sector information;
   said storage means having the capacity to store the information corresponding to a multiplicity of scans of the receiving system;
   ordering means operatively receiving the contents of said storage means for ordering the output from said storage means and arranging said outputs according to received information correlated with a respective range increment and sector;
   correlation means including other storage means operatively connected to said ordering means for storing radio information from said storage means indexed with respect to an individual range increment and sector;
   said correlation means being operative to perform a cross correlation with a class of possible tracks to determine the probability of a track in said medium; and
   track detector means operatively coupled to the outputs of said other storage means for making a decision as to the absence or presence of a track in the medium.

3. A track detection system comprising;
   receiving means for receiving radio frequency information from objects in a medium;
   said receiving means being operative to correlate said received information with respect to a sector and a particular scan and also being operative to separate said received information according to discreet range intervals corresponding to range bins;
   buffer means operatively connected to the output of said receiving means for receiving and retaining video information therein so that said video information retains sector scan and range identification;
   storage means operatively connected to the output of said buffer means for receiving information from said buffer means and storing said information;
   said storage means having the ability to store information for a number of scans of said receiving means and retaining said information correlated with respect to range, sector and scan;
   control means operatively connected to said storage means and said buffer means for sequentially shifting information from said buffer means to said storage means;
   ordering means operatively receiving the contents of said storage means for sorting the information from said storage means with respect to time;
   correlation means including other storage means operatively coupled to the output of said ordering means for receiving information from said ordering means and storing information therein corresponding to range, sector and scan;
   said other storage means retaining an amount of information corresponding to s where s is the average number of pulses transmitted by a radio frequency system in an azimuth sector;
   said correlation means being operative to perform a cross correlation with a class of probable tracks to determine the probability of a track in a medium; and
   track detector means operatively coupled to the output of said other storage means for making a decision as to the presence or absence of a track in the medium.

4. A track detection system as set forth in claim 3 wherein;
   said storage means comprises a magnetic drum.

5. A track detection system as set forth in claim 3 wherein;
   said other storage means comprises at least one serial shift register having a number of stages corresponding to the number of range bins for a given sector; and
   wherein outputs are taken from various of the stages corresponding to the range bins in the shift register for performing the cross correlation against a class of possible tracks.

6. A track detection system as set forth in claim 3 wherein;
   said other storage means comprises y serial shift registers wherein y is the number of scans for which information is to be processed;
   each register having a number of stages corresponding to b·t where b is the number of range bins of interest and t is the number of bits necessary to represent the data from a single range bin; and
   said cross correlation is accomplished by making connections to individual stages of said registers corresponding to range bins in a predetermined theoretical track sequence.

* * * * *